United States Patent [19]
White et al.

[11] Patent Number: 5,499,681
[45] Date of Patent: Mar. 19, 1996

[54] CENTRALIZING LINER HANGER METHOD AND SYSTEM FOR SUBTERRANEAN MULTILATERAL WELL DRILLING

[75] Inventors: Pat M. White; John C. Gano, both of Carrollton, Tex.

[73] Assignee: Halliburton Company, Houston, Tex.

[21] Appl. No.: 380,905

[22] Filed: Jan. 30, 1995

Related U.S. Application Data

[63] Continuation-in-part of Ser. No. 296,941, Aug. 26, 1994.

[51] Int. Cl.⁶ ............................ E21B 23/00; E21B 43/00
[52] U.S. Cl. ............................................. 166/382; 166/208
[58] Field of Search ................................. 166/382, 383, 166/208, 212, 217

[56] References Cited

U.S. PATENT DOCUMENTS

| | | | |
|---|---|---|---|
| 4,603,743 | 8/1986 | Lindsey, Jr. ........................ | 166/208 X |
| 4,606,408 | 8/1986 | Zunkel ................................. | 166/278 |
| 4,926,936 | 5/1990 | Braddick ............................. | 166/208 X |
| 5,074,362 | 12/1991 | Allwin ................................. | 166/208 X |
| 5,325,924 | 7/1994 | Bangert et al. .................... | 166/50 X |

OTHER PUBLICATIONS

Power, Michael M., "Completing Deep Horizonatal Well", *Petroleum Engineer International*, Nov. 1990, pp. 37–41.

*Primary Examiner*—William P. Neuder
*Attorney, Agent, or Firm*—William M. Imwalle; David H. Hitt

[57] ABSTRACT

A liner hanger and a method of hanging a liner. The liner hanger comprises: (1) a slip having a gripping surface thereon and adapted to slide axially with respect to the liner between a retracted position and a deployed position, (2) a slip housing located radially outwardly of the slip and covering the slip when the slip is in the retracted position, (3) a slip carrier slidably mounted to the liner and adapted to move axially with respect to the liner and (4) a slip arm extending from the slip carrier and coupling the slip carrier and a slip having a gripping surface thereon and adapted to slide axially with respect to the liner between a retracted position and a deployed position, the slip carrier capable of transmitting a deploying force to the slip via the slip arm to move the slip from the retracted position to the deployed position, the slip arm partially collapsing when the deploying force exceeds a predetermined limit, a nose extension of the slip carrier moving toward and directly engaging the slip as the slip arm partially collapses allowing further transmission of the deploying force exceeding the predetermined limit from the slip carrier to the slip via the nose extension to centralize the liner hanger(s). In a related embodiment of the present invention, spaced-apart first and second liner hangers may cooperate to allow the liner to be employed as a drill guide.

58 Claims, 2 Drawing Sheets

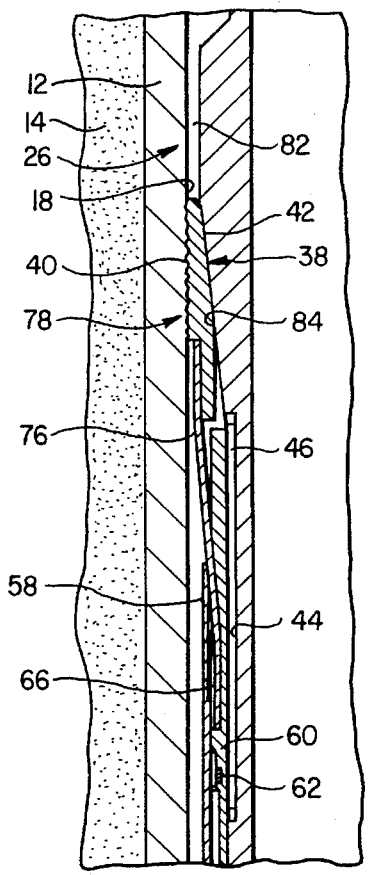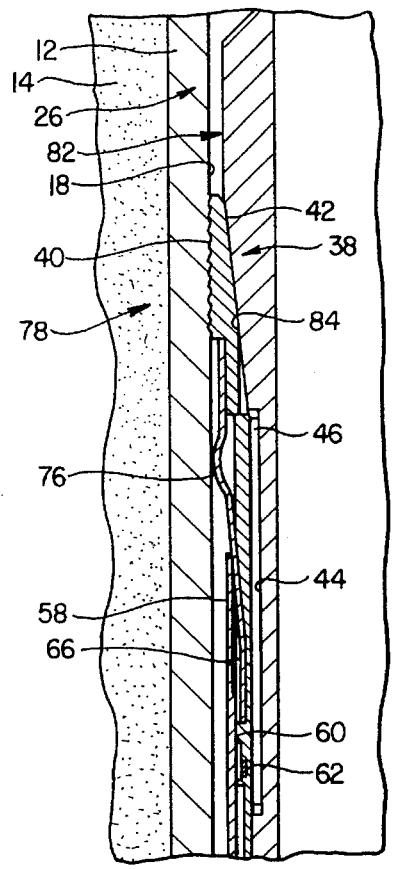
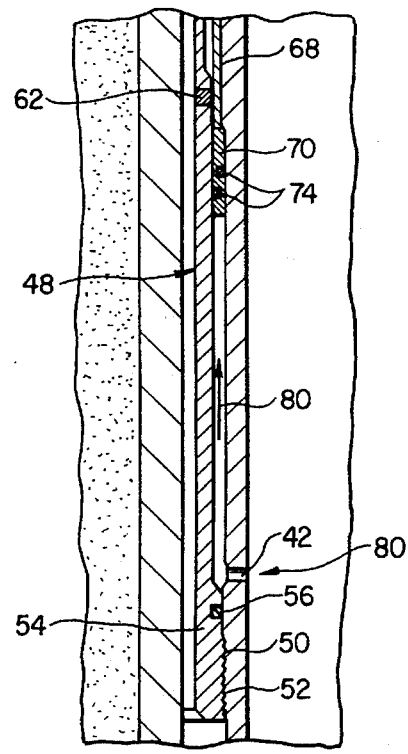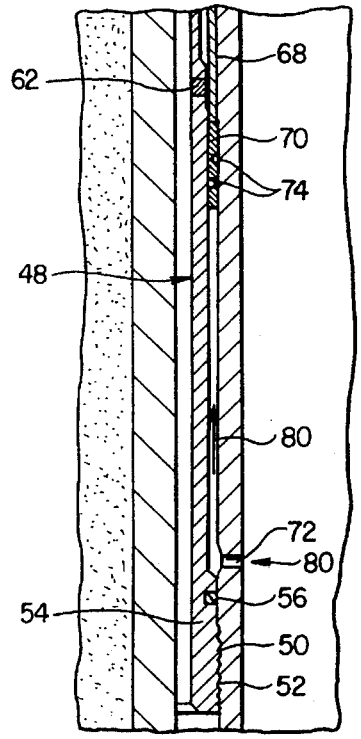
FIG. 3    FIG. 4

CENTRALIZING LINER HANGER METHOD AND SYSTEM FOR SUBTERRANEAN MULTILATERAL WELL DRILLING

CROSS-REFERENCE TO RELATED APPLICATION

This is a continuation-in-part of Ser. No. 08/296,941, filed on Aug. 26, 1994, entitled "Improved Methods and Systems for Subterranean Multilateral Well Drilling and Completion," commonly assigned with the present invention and incorporated herein by reference.

TECHNICAL FIELD OF THE INVENTION

The present invention is directed, in general, to well drilling and completion in a multilateral drilling operation and more specifically to methods and systems for hanging a liner in a main wellbore, the liner extending from the main wellbore into a lateral wellbore.

BACKGROUND OF THE INVENTION

Horizontal well drilling and production have become increasingly important to the oil industry in recent years. While horizontal wells have been known for many years, only relatively recently have such wells been determined to be a cost-effective alternative to conventional vertical well drilling. Although drilling a horizontal well costs substantially more than its vertical counterpart, a horizontal well frequently improves production by a factor of five, ten or even twenty in naturally-fractured reservoirs. Generally, projected productivity from a horizontal wellbore must triple that of a vertical wellbore for horizontal drilling to be economical. This increased production minimizes the number of platforms, cutting investment and operational costs. Horizontal drilling makes reservoirs in urban areas, permafrost zones and deep offshore waters more accessible. Other applications for horizontal wellbores include periphery wells, thin reservoirs that would require too many vertical wellbores, and reservoirs with coning problems in which a horizontal wellbore could be optimally distanced from the fluid contact.

Also, some horizontal wellbores contain additional wellbores extending laterally from the primary vertical wellbores. These additional lateral wellbores are sometimes referred to as drainholes and vertical wellbores containing more than one lateral wellbore are referred to as multilateral wells. Multilateral wells are becoming increasingly important, both from the standpoint of new drilling operations and from the increasingly important standpoint of reworking existing wellbores, including remedial and stimulation work.

As a result of the foregoing increased dependence on and importance of horizontal wells, horizontal well completion, and particularly multilateral well completion, have been important concerns and continue to provide a host of difficult problems to overcome. Lateral completion, particularly at the juncture between the main and lateral wellbores, is extremely important to avoid collapse of the wellbore in unconsolidated or weakly consolidated formations. Thus, open hole completions are limited to competent rock formations; and, even then, open hole completions are inadequate since there is no control or ability to access (or reenter the lateral) or to isolate production zones within the wellbore. Coupled with this need to complete lateral wellbores is the growing desire to maintain the lateral wellbore size as close as possible to the size of the primary vertical wellbore for ease of drilling and completion. Additionally, there is substantial concern for prematurely setting the liner in the casing or inadvertently hanging the liner near the later wellbore on the casing since such actions could result in extensive and costly time delays.

Various types of liner hangers are well known in the art and have been used extensively in conventional well completions and have also been utilized in multilateral well completions. In many instances, the prior art liner hangers consist of a plurality of gripping slips radially disposed about the circumference of the liner. These slips of the liner hangers, while in a retracted position are fully, or at least partially exposed, thereby making them susceptible to either premature deployment against the sides of the casing, particularly by catching on a lateral wellbore casing window at the juncture between the main and lateral wellbores.

Multilateral drilling operations may include either providing a critical section of casing with a pre-formed window or forming a window in the casing after the casing is set in the main wellbore. The presence of the window presents potential problems for the exposed slips that were not present in conventional single wellbore operations. For example, in some instances, the portion of the liner on which the liner hangers are positioned is inadvertently inserted through the window. The window typically has sharp corners that can catch one of the exposed slips as the liner is inserted therethrough, causing it and the other slips to deploy prematurely. When the slips deploy in this manner, they hang on the corners of the window. Extensive and costly time and effort must then be spent in trying to free the liner. In some cases, the liner cannot be freed and a new lateral wellbore must be drilled, thereby greatly increasing the cost of the drilling project.

Another disadvantage associated with these conventional liner hangers is that the single set of liner hangers inadequately centralizes the portion of the liner that resides in the main wellbore for two reasons. First, lateral wellbores typically have significant curvature or "build radius" associated with their drill path. When the liner is inserted in the lateral wellbore with an upper portion remaining in the main wellbore, the curvature of the lateral wellbore path causes a spring force to be exerted by the liner's upper portion against the casing wall. The above-discussed conventional liner hangers, when deployed, have a slip arm that deploys the slip between the liner and the casing wall. However, when the slip arm encounters substantial resistant force resulting from wedging the slip between the confined space between the casing wall and the liner, the slip arm begins to bow or flex, and in some cases collapses completely, thereby preventing the slip from being deployed further to effectively centralize the liner's upper portion within the casing. Second, such conventional liner hangers typically have only one set of liner hangers positioned on the liner. Even with the hangers properly deployed, the section of liner below the hangers may still be de-centralized and therefore slightly curved because there is not another set of hangers to straighten and align a portion of the liner. When more than one liner hanger is employed, they must be sufficiently distanced, one from the others, so that the liner hanger is concentrically oriented to and parallel to the wellbore. A dual coned hanger is known that provides two points of centralization, but the two points are too close together to brace the liner sufficiently to maintain a concentric and parallel orientation during use.

Therefore, what is needed in the art is a liner hanger apparatus and methods associated therewith related to multilateral well drilling and completion processes that have a protective covering over the slip housing to prevent the slips from catching and deploying prematurely and that also provide for a centralization and forced alignment of a portion of the liner residing in the main wellbore that can act as a drill guide for subsequent drilling and completion operations.

SUMMARY OF THE INVENTION

To address the above-discussed deficiencies of the prior art, it is a primary object of the present invention to provide a liner hanger apparatus and methods associated therewith related to multilateral well drilling and completion processes.

In the attainment of the primary object, the present invention provides a liner hanger and a method of hanging a liner. In a first aspect of the present invention, the liner hanger comprises: (1) a slip having a gripping surface thereon and adapted to slide axially with respect to the liner between a retracted position and a deployed position and (2) a slip housing located radially outwardly of the slip and covering the slip when the slip is in the retracted position, the slip emerging from under the slip housing when moving toward the deployed position, the slip housing preventing the gripping surface of the slip from contacting a casing when the slip is in the retracted position, the slip housing thereby preventing premature movement of the slip toward the deployed position by virtue of the contacting.

In a preferred embodiment of the present invention, the liner hanger further comprises: (1) a slip carrier slidably mounted to the liner and adapted to move axially with respect to the liner and (2) a slip arm extending from the slip carrier and coupling the slip carrier and the slip, the slip carrier capable of transmitting a deploying force to the slip via the slip arm to move the slip from the retracted position to the deployed position, the slip arm partially collapsing when the deploying force exceeds a predetermined limit, a nose extension of the slip carrier moving toward and directly engaging the slip as the slip arm partially collapses thereby to allow further transmission of the deploying force exceeding the predetermined limit from the slip carrier to the slip via the nose extension. As used herein, the phrase "predetermined limit" means that amount of force transmitted through the slip arm at which the structure of the slip arm begins to fail resulting in the collapse or folding of the slip arm. The predetermined limit is, of course, dependent on the material, dimensions and the strength of that material from which the slip arm is made. This embodiment has distinct advantages over the above-discussed prior art devices. For example, the engagement of the nose extension against the slip subsequent to the slip arm's partial collapse provides a deploying force that wedges the slip further between the casing and the liner. This not only more securely hangs the liner, but it also provides adequate centralization and alignment of the liner.

In a preferred embodiment of the present invention, the liner hanger further comprises a centralizer mandrel associated with the liner and having a ramp thereon. The ramp forces the slip radially outwardly as the slip moves from the retracted position toward the deployed position. The slip bears against the ramp as the gripping surface contacts the casing to hang the liner.

In a preferred embodiment of the present invention, the liner comprises a duality of axially separated liner hangers. The duality cooperates to hang the liner within the casing in a desired location and direction. As such, the liner is capable of being employed as a drill guide. The subsequent deployment of the dual axially spaced-apart liner hangers permits the upper portion of the liner to serve as a drill guide for subsequent drilling operations. The separate set of hangers are deployed in such a manner to centralize and axially align a portion of the liner, thereby creating a substantially straight and centralized section of the liner that can serve as a drill guide, an advantage that is not offered by the above-discussed prior art devices.

In a preferred embodiment of the present invention, the slip housing is tubular and surrounds the liner. The liner hanger further comprises a plurality of slips located regularly about a circumference of the liner and is adapted to slide axially with respect to the liner between retracted positions and deployed positions thereby to centralize the liner as the slips move toward the deployed positions. The plurality of slips are equally spaced about the circumference so that when they are deployed, they create opposing, centralizing forces with respect to the liner.

In a preferred embodiment of the present invention, the liner hanger further comprises a tubular piston surrounding the liner and coupled to the slip. The piston slides the slip axially with respect to the liner when hydraulic fluid contacting the piston places a force on the piston. Because the piston encompasses the circumference of the liner, the single piston can be used to concurrently activate a plurality of slips about the perimeter of the liner, thereby to provide a combined centralizing force.

In a preferred embodiment of the present invention, the slip is located within a pocket in an outer wall of the liner, the slip housing covering the pocket and the slip when the slip is in the retracted position. This aspect is a significant advantage over the above-discussed prior art devices because the pocket that is covered by the slip housing provides a protective covering for the slip. As such, the slip cannot inadvertently contact a portion of case and prematurely deploy.

In a preferred embodiment of the present invention, the liner extends through a window in the casing. The slip housing prevents the gripping surface of the slip from contacting a periphery of the window when the slip is in the retracted position. As such, the slip housing thereby prevents the premature movement of the slip toward the deployed position by virtue of the contacting. In the above-discussed prior art devices, when the portion of the liner on which the liner hangers is positioned is run past the window, there is significant risk that the slips may contact the casing and deploy prematurely, causing extensive time and cost in freeing the liner. Since the slips of the present invention are covered and, therefore, stay covered until deployed, the risk of premature deployment is essentially eliminated.

In a preferred embodiment of the present invention, the liner extends through a window in the casing. The liner bends and exerts a spring force on a side of the casing. The slip serves to centralize the liner within the casing as the slip moves toward the deployed position. When the slip, which opposes the casing wall against which the spring force is exerted, is deployed the slip exerts an opposing force to that of the spring force and causes the liner to move toward a centralizing position.

In a preferred embodiment of the present invention, a slip carrier is slidably mounted to the liner and adapted to move axially with respect to the liner. The slip carrier is releasably coupled to the slip housing by a shear pin. The shear pin functions as a restraining force to prevent the slip from moving to a deployed position until such time when a force, which is sufficient to shear the shear pin, is axially exerted against the slip carrier, thereby allowing the slip carrier to move axially against the slip.

In a second aspect of the present invention, the liner hanger comprises: (1) a slip carrier slidably mounted to the liner and adapted to move axially with respect to the liner and (2) a slip arm extending from the slip carrier and coupling the slip carrier and a slip having a gripping surface thereon and adapted to slide axially with respect to the liner between a retracted position and a deployed position, the slip carrier capable of transmitting a deploying force to the slip via the slip arm to move the slip from the retracted position to the deployed position, the slip arm partially collapsing when the deploying force exceeds a predetermined limit, a nose extension of the slip carrier moving toward and directly engaging the slip as the slip arm partially collapses thereby to allow further transmission of the deploying force exceeding the predetermined limit from the slip carrier to the slip via the nose extension. The unique combination of elements as set forth above provides a novel liner hanger that simultaneously provides greater securing force and centralizing effect for the liner via the deployment of the nose extension against the slip.

In a third aspect, the present invention provides a drill guide, comprising: (1) a tubular liner having an upper portion located within a casing and a lower portion extending through a window in the casing, the liner bending and exerting a spring force on a side of the casing, the spring force tending to misalign the liner with respect to a centerline of the casing and (2) first and second centralizing liner hangers spaced apart along a length of the upper portion, the first and second liner hangers fixing the upper portion of the liner at a desired location within the casing, the first and second liner hangers cooperating to counteract the spring force to centralize the liner with respect to the centerline and hang the liner within the casing in a desired direction, the direction defining a drilling direction of a drilling tool passing through the upper portion.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a vertically foreshortened, partial cross-sectional view of the liner hanger apparatus on the left side of its center line with the slip in the deployed position wherein the slip arm is partially flexed to deploy the slip; and FIG. 4 illustrates a vertically foreshortened, partial cross-sectional view of the liner hanger apparatus on the left side of its center line with the slip in the deployed position wherein the slip arm is collapsed and the nose extension directly engages the slip.

DETAILED DESCRIPTION

Figure 1:
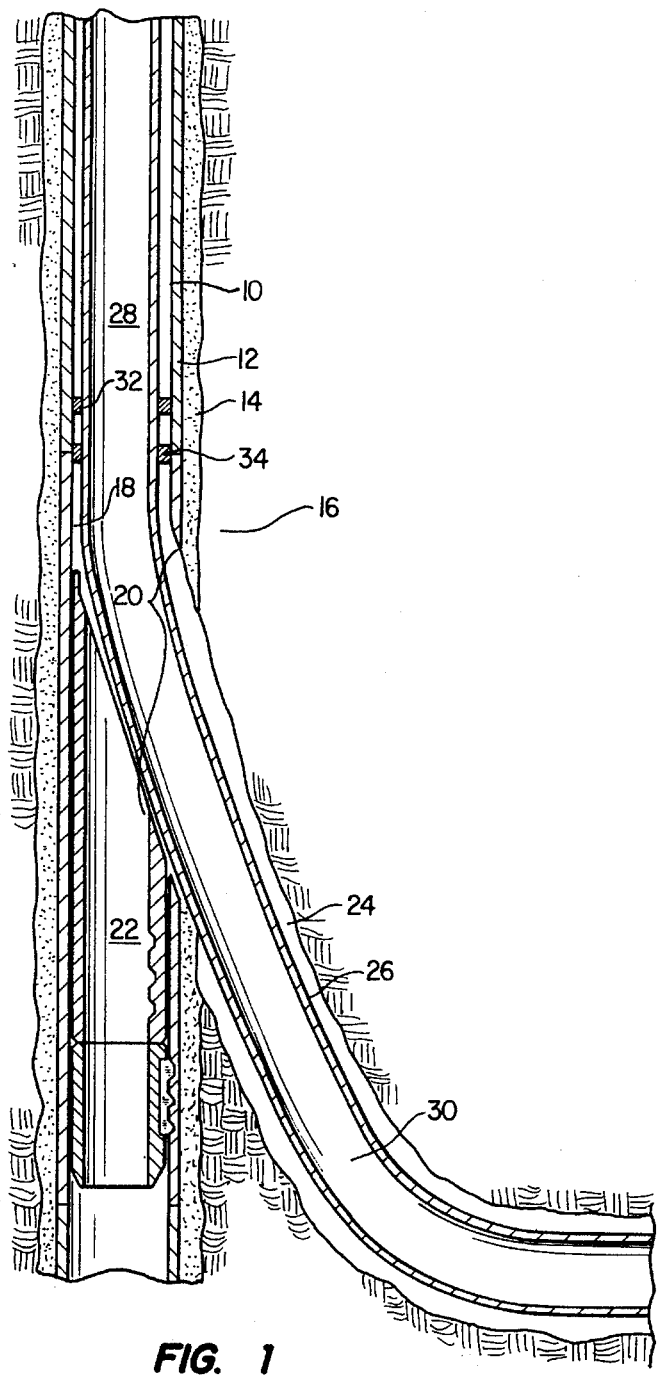
FIG. 1 illustrates a vertically foreshortened, highly schematic partial cross-sectional view of a cased main wellbore after the step of setting and cementing with a lateral wellbore having a liner inserted therein and hung with axially spaced apart liner hangers within the main wellbore.

Turning initially to FIG. 1, there is illustrated a vertically foreshortened, highly schematic partial cross-sectional view of a main wellbore 10 with casing 12 that has been set and cemented in place with casing cement 14 squeezed between the exterior wall of the casing 12 and the various geological formations 16. The casing 12 has formed in its side wall 18 a casing window 20 with a diverter or whipstock 22 set immediately below the casing window 20 for directional drilling. A lateral wellbore 24 having been drilled in a generally lateral direction from the main wellbore 10 as determined by the orientation of the diverter 22 is also illustrated. Received in the lateral wellbore 24 is a liner 26, which has not been cemented into place. A first portion 28 of the liner 26 extends and resides uphole within the casing 12 and a second portion 30 of the liner 26 extends a predetermined distance into the lateral wellbore 24. As schematically illustrated, the liner 26 is hung or secured in place within the main wellbore 10 via liner hangers 32,34. As shown schematically, there are, preferably, a duality of axially separated liner hangers 32,34 that correctly align and centralize the liner 26 within the main wellbore 10 such that the centralized liner 26 may serve as a drill guide in a manner as hereinafter described. In a preferred embodiment, there are two sets of liner hangers. Each set is preferably comprised of four slips regularly spaced around the outer circumference of the liner 26.

Figure 2:
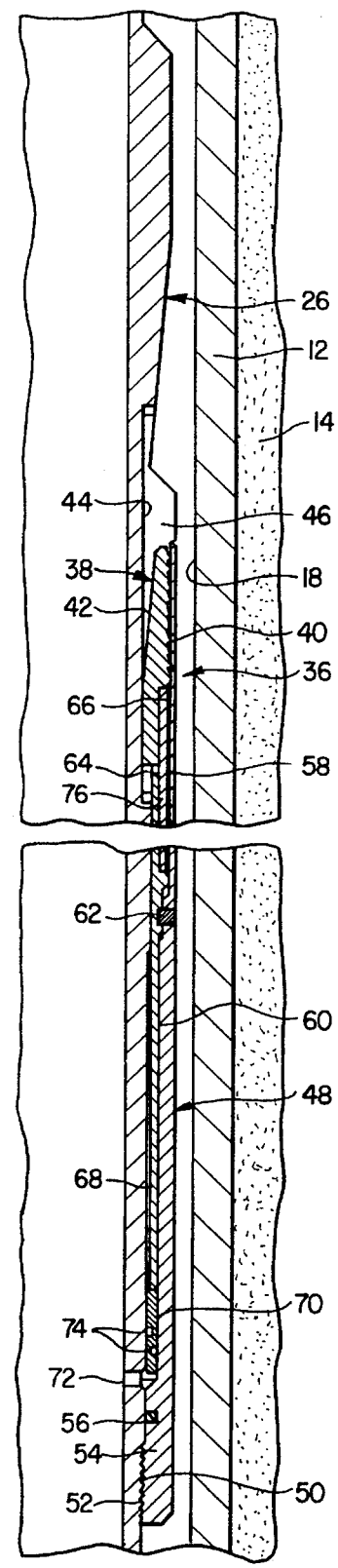
FIG. 2 illustrates a vertically foreshortened, partial cross-sectional view of the liner hanger apparatus on the right side of its center line with the slip in the retracted position.

Turning now to FIG. 2, there is illustrated a vertically foreshortened, enlarged partial cross-sectional view of a liner hanger 36 previously mentioned and schematically illustrated in FIG. 1, as seen from the right of the liner's 26 center line. The liner 26 is received within the casing 12 that is set in place by the cement 14. The liner hanger 36 is comprised of a slip 38 having an outer gripping surface 40 thereon and an inner surface 42 opposing an outer wall 44 of the liner 26. The slip 38 is adapted to slide axially with respect to the liner 26 between a retracted position (as shown in FIG. 2) and a deployed position. The slip 38 is preferably received in a slip pocket 46 that is milled from the outer wall 44 of the liner 26. In a preferred embodiment, the liner hanger 36 comprises a plurality of slips 38 that are equally spaced regularly about the outer circumference of the liner 26 and that are adapted to slide axially with respect to the liner 26 between retracted positions and deployed positions to thereby centralize the liner 26 as the slips 38 move toward their respective deployed positions.

A slip housing 48 that is located radially outwardly from the slip 38 covers and secures the slip 38 between the outer wall 44 of the liner 26 and the slip housing 48 when the slip 38 is in the retracted position. The slip housing 48 is tubular and surrounds the outer perimeter of the liner 26 and is preferably attached to the liner 26 by interengaging and cooperating threads 50 formed in an interior wall perimeter 52 near an anchor end 54 of the slip housing 48 and on the outer wall 44 of the liner 26 at a predetermined point. The anchor end 54 preferably has a rubber seal 56, such as an "O" ring, positioned between the interior wall 52 of the anchor end 54 and the outer wall 44 of the liner 26 to prevent the leakage of fluid between the threads 50. The slip housing 48 has a slip cover portion 58 that is offset from the anchor end 54 and the outer wall 44 of the liner 26 and that extends along a length of the liner 26 to cover the slip 38 when in the retracted position.

When the slip 38 is in the illustrated retracted position, the slip housing 48 prevents the gripping surface 40 of the slip 38 from contacting the casing 12, which thereby prevents inadvertent premature movement of the slip 38 toward the deployed position. This can be significantly advantageous because premature deployment of the slip 38 can cause the liner 26 to be set prematurely thereby causing a great deal of time and money to be spent trying to unseat the liner hanger 36 and free the liner 26 from the casing 12. In any lateral wellbore completion method, it is extremely important that the liner be hung at the appropriate distance from the casing window. However, due to the large weights and lengths of associated with liners used in the completion of a well, it is not always possible to keep the liner perfectly aligned with the central axis of the main wellbore as the liner is run into the main wellbore. As such, the sides of the liner, and thus, the hanger often come into contact with the sides of the casing as the liner is run into the main wellbore. As a result, slips used in conventional hanger devices can be inadvertently and prematurely deployed against the casing as the liner is run into the hole because the slip housing 48 is not present to cover and prevent the slips 38 from gripping the side of the casing 12. The liner can be, therefore, prematurely set against the casing substantially uphole from the desired distance from the casing window causing extensive and costly time delays in the drilling and completion processes. Additionally, in some cases, the end of the liner on which the hanger is positioned is run through the window. In such instances, the slip in conventional devices may catch on the sharp edge-points of the casing that are formed when the casing window is formed, which results in extensive and costly time delays in freeing the liner from the casing.

The liner hanger 36 preferably further comprises a slip carrier 60 that is slidably mounted to the liner 26 between the slip housing 48 and the outer wall 44 of the liner 26 and is adapted to move axially with respect to the liner 26. In a preferred embodiment, the slip carrier 60 is releasably coupled to the slip housing 48 by a shear pin 62 and extends a substantial length of the slip housing 48, as illustrated. The slip carrier 60 has an upper end 64 with a groove 66 formed therein and a lower end 68 that is in physical contact with a tubular piston 70, which surrounds the outer perimeter of the liner 26. The piston 70 is slidably received between the slip housing 48 and the outer wall 44 of the liner 26 and is axially slidable with respect to the liner 26 when hydraulic fluid (not shown) contacts and places a force on the piston 70 via a pressure port 72. The piston 70 preferably includes rubber seals 74, such as "O" rings, placed on opposing sides of the piston 70 to respectively seal those sides against leakage of fluid between the piston 70 and the outer wall 44 of the liner 26 and the interior wall 52 of the slip housing 48. In the retracted position, the piston 70 is positioned near the anchor end 54 of the slip housing 48 and exerts no deploying force against the slip carrier 60.

A slip arm 76 is received in the groove 66 of the slip carrier 60, extends from the slip carrier 60 and couples the slip carrier 60 and the slip 38. The slip carrier 60 is capable of transmitting a deploying force to the slip 38 via the slip arm 76 to move the slip 38 from the retracted position to the deployed position when hydraulic pressure is applied through the pressure port 72 as hereinafter described.

Turning now to FIG. 3, there is illustrated a vertically foreshortened, enlarged partial cross-sectional view of a liner hanger 78 previously mentioned and schematically illustrated in FIG. 1, as seen from the left of the liner's 26 center line. The liner 26 is received within the casing 12 that is set in place by the cement 14, and the slip 38 is illustrated in the deployed position with the gripping surface 40 wedged against the inner side wall 18 of the casing 12. As shown, hydraulic pressure (indicated by the arrow 80) has been exerted against the piston 70 via the pressure port 72 with a conventional hydraulic pressurizing tool (not shown). It will, of course, be appreciated that where a plurality of slips are present, the slips are concurrently deployed by the hydraulic pressure via their respective pressure ports. In response to the hydraulic pressure 80, the piston 70 has moved axially upwardly with respect to the liner 26 between the slip housing 48 and the outer wall 44 of the liner 26 and has engaged the lower end 68 of the slip carrier 60 and exerted a force thereagainst. The upward force exerted against the slip carrier 60 has sheared the shear pin 62. With the slip carrier 60 freed from the retraining effect of the shear pin 62, the piston 70 has driven the slip carrier 60 also in an upward direction, which in turn has forced the slip arm 76 and the slip 38 in an upward direction, thereby causing the slip 38 to be removed from the slip pocket 46. The interior wall 52 of the slip 38 has engaged a centralizer mandrel 82 that is associated with the liner 26. The centralizer mandrel 82 has a ramp portion 84 thereon that has forced the slip 38 radially outwardly as it moved from the retracted position toward the deployed position. The interior wall 52 of the slip 38 bears against the ramp portion 84 as the gripping surface 40 contacts the inner side wall 18 of the casing 12 to thereby hang the liner 26.

As shown in FIG. 3, the slip arm 76 has partially flexed or bowed as the result of the deploying force. However, now turning to FIG. 4, there is illustrated the deployed hanger liner 26 as illustrated in FIG. 3 with the exception that the slip arm 76 is shown to be collapsed because the deploying force has exceeded a predetermined limit. As illustrated, the collapse of the slip arm 76 has allowed the nose extension 86 of the slip carrier 60 to move toward and directly engage the slip 38. The nose extension 86 is capable of further transmission of a deploying force that exceeds the predetermined limit of the slip arm 12. This further transmission of the deploying force has forced the slip 38 to a greater extent between the casing 12 and the liner 26 which provides for even better anchoring of the liner 26 against the casing 12. The additional deploying force exerted by the nose extension 86 engaging the slip 38 is a distinct advantage particularly when used in lateral wellbore operations.

Typically, the insertion of the liner 26 through the casing window 20 of the casing 12 and into the lateral wellbore 24 causes a bend in the liner 26 (see FIG. 1), which creates a spring force against a side of the casing 12 that is opposite the casing window 20. As the slip 38 is moved fully toward the deployed position by the nose extension 84, the additional deploying force is sufficient to counter the effects of the spring force and permits the slip 38 to wedge further between the casing 12 and the liner 26, thereby to centralize the liner 26 within the casing 12.

With the apparatus having been described, the method of operation of the liner hanger will now be described with reference to FIGS. 1–2. In a conventional manner, a main wellbore 10 is drilled, after which casing 12 is set and cemented into place within the main wellbore 10. A diverter 22 is set in place at the desired depth and oriented in the desired direction. If the casing 12 does not have a preformed window, a casing window 20 is then formed in the casing 12 with a drill bit that has been appropriately deflected by the diverter 22. After the casing window 20 is formed, the lateral wellbore 24 is conventionally drilled to the desired depth. A liner 26 is then run into the lateral wellbore 24 via the diverter 22. The liner 26 is provided with dual axially spaced liner hangers 32,34 that positioned within a slip pocket 46 and are covered by a slip housing 48. The liner 26 also has a centralizing mandrel 82 with a ramp portion 84 formed on the outer wall 44 of the liner 26 adjacent the slip pocket 46. Preferably, the liner hangers 32,34 are axially spaced approximately 6 feet apart. The liner hangers 32,34 each preferably comprise three or four slips per hanger which are regularly spaced around the outer circumference of the liner 26. In a conventional manner, hydraulic pressure is applied to the interior of the liner thereby setting the slips of hangers 32,34.

The specific deployment of an individual hanger will now be discussed with primary reference to FIGS. 2–4. Prior to the hydraulic pressure's application, the slip 38 is in the retracted position within the slip pocket 46. The slip 38 is held in the retracted position via the shear pin 62 that couples the slip housing 48 and the slip carrier 60 to which the slip 38 is coupled. As hydraulic pressure 80 is applied to the hanger 36 via the pressure port 72, a force is exerted against the piston 70, which is in contact with the lower end 68 of the slip carrier 60. The rubber seals 56,74 on the anchor end 54 and the piston 70 prevent the hydraulic fluid from leaking from the hanger apparatus. The hydraulic pressure 80 is exerted against the piston 70 and thus the slip carrier 60. The hydraulic pressure 80 creates a force that is sufficient to shear the shear pin 62 and allows the piston 70 to drive the slip carrier 60 axially upward with respect to the liner 26. The upward motion of the slip carrier 60 causes the slip arm 76 to move the slip 38 from the slip pocket 46. As the slip 38 moves from the slip pocket 46, the interior wall 52 of the slip 38 engages the ramp portion 84 of the liner 26. The ramp portion 84 forces the slip 38 radially outwardly from the liner 26 as the slip 38 moves from the retracted position toward the deployed position. The slip 38 bears against the ramp portion 84 as the gripping surface 40 contacts the casing 12 and thereby hangs the liner 26 in place.

As the slip arm 76 engages the slip 38 against the casing 12, the slip arm 76 begins to bow or flex in response to the counter acting force resulting from the slip 38 engaging the casing 12. However, as hydraulic pressure 80 is further applied to the hanger 78 via the pressure port 72, the force overcomes the slip arm's 76 support strength and the slip arm 76 begins to partially collapse, which allows the nose extension 86 of the slip carrier 60 to directly engage the slip 38. The slip carrier 60 has sufficient support strength to further wedge the slip 38 between the casing 12 and the liner 26, thereby increasing the centralizing force and effect of the liner hanger 78. Additionally, in many instances, a spring force is created in the first portion 28 of the liner 26 by the bend in the liner 26. This spring force is exerted by the first portion 28 against the side of the casing 12 opposite the window 20 and results in the liner 26 being de-centralized within the casing 12. When the slip 38 is deployed against the side of the casing 12, against which the spring force is exerted, the wedging action of the slip 38 forces the first portion 28 of the liner 26 away from the side of the casing 12. Furthermore, when the plurality of slips are concurrently deployed, they have the effect of substantially centralizing the first portion 28 of the liner 26 in the casing 12, thereby to form a drill guide for subsequent operations. The drill guide serves to aim a drilling tool directly at the center of a hollow whipstock 22 beneath the liner 26, allowing the liner 26 and whipstock 22 to be drilled out and reestablishing access to other regions of the main wellbore 10.

From the above, it is apparent that the present invention provides a liner hanger and a method of hanging a liner. The liner hanger comprises: (1) a slip having a gripping surface thereon and adapted to slide axially with respect to the liner between a retracted position and a deployed position, (2) a slip housing located radially outwardly of the slip and covering the slip when the slip is in the retracted position, (3) a slip carrier slidably mounted to the liner and adapted to move axially with respect to the liner and (4) a slip arm extending from the slip carrier and coupling the slip carrier and a slip having a gripping surface thereon and adapted to slide axially with respect to the liner between a retracted position and a deployed position, the slip carrier capable of transmitting a deploying force to the slip via the slip arm to move the slip from the retracted position to the deployed position, the slip arm partially collapsing when the deploying force exceeds a predetermined limit, a nose extension of the slip carrier moving toward and directly engaging the slip as the slip arm partially collapses thereby to allow further transmission of the deploying force exceeding the predetermined limit from the slip carrier to the slip via the nose extension.

In a related embodiment of the present invention, spaced-apart first and second liner hangers may cooperate to allow the liner to be employed as a drill guide.

Although the present invention and its advantages have been described in detail, those skilled in the art should understand that they can make various changes, substitutions and alterations herein without departing from the spirit and scope of the invention in its broadest form.

What is claimed is:

1. A liner hanger for a liner, comprising:

a slip having a gripping surface thereon and adapted to slide axially with respect to said liner between a retracted position and a deployed position; and a slip housing located radially outwardly of said slip and covering said slip when said slip is in said retracted position, said slip emerging from under said slip housing when moving toward said deployed position, said slip housing preventing said gripping surface of said slip from contacting a casing when said slip is in said retracted position, said slip housing thereby preventing premature movement of said slip toward said deployed position by virtue of said contacting.

2. The liner hanger as recited in claim 1, further comprising:

a slip carrier slidably mounted to said liner and adapted to move axially with respect to said liner; and a slip arm extending from said slip carrier and coupling said slip carrier and said slip, said slip carrier capable of transmitting a deploying force to said slip via said slip arm to move said slip from said retracted position to said deployed position, said slip arm partially collapsing when said deploying force exceeds a predetermined limit, a nose extension of said slip carrier moving toward and directly engaging said slip as said slip arm partially collapses thereby allowing further transmission of said deploying force exceeding said predetermined limit from said slip carrier to said slip via said nose extension thereby centralizing said liner.

3. The liner hanger as recited in claim 1, further comprising a centralizer mandrel associated with said liner and having a ramp thereon, said ramp forcing said slip radially outwardly as said slip moves from said retracted position toward said deployed position, said slip bearing against said ramp as said gripping surface contacts said casing to hang said liner.

4. The liner hanger as recited in claim 1 wherein said liner comprises a duality of axially separated liner hangers, said duality cooperating to hang said liner within said casing in a desired location and direction, said liner capable of being employed as a drill guide.

5. The liner hanger as recited in claim 1 wherein said slip housing is tubular and surrounds said liner, said liner hanger further comprising a plurality of slips located regularly about a circumference of said liner and adapted to slide axially with respect to said liner between retracted positions and deployed positions thereby to centralize said liner as said slips move toward said deployed positions.

6. The liner hanger as recited in claim 1, further comprising a tubular piston surrounding said liner and coupled to said slip, said piston sliding said slip axially with respect to said liner when hydraulic fluid contacting said piston places a force on said piston.

7. The liner hanger as recited in claim 1 wherein said slip is located within a pocket in an outer wall of said liner, said slip housing covering said pocket and said slip when said slip is in said retracted position.

8. The liner hanger as recited in claim 1 wherein said liner extends through a window in said casing, said slip housing preventing said gripping surface of said slip from contacting a periphery of said window when said slip is in said retracted position, said slip housing thereby preventing said premature movement of said slip toward said deployed position by virtue of said contacting.

9. The liner hanger as recited in claim 1 wherein said liner extends through a window in said casing, said liner bending and exerting a spring force on a side of said casing, said slip serving to centralize said liner within said casing as said slip moves toward said deployed position.

10. The liner hanger as recited in claim 1 wherein a slip carrier slidably mounted to said liner and adapted to move axially with respect to said liner is releasably coupled to said slip housing by a shear pin.

11. A method of hanging a liner within a casing, comprising the steps of:

providing a slip on said liner, said slip having a gripping surface thereon and adapted to slide axially with respect to said liner between a retracted location and a deployed position, a slip housing located radially outwardly of said slip and covering said slip when said slip is in said retracted position, said slip housing preventing said gripping surface of said slip from contacting said casing when said slip is in said retracted position;

moving said liner axially through said casing until said liner reaches a predetermined position within said casing; and deploying said slip, said slip emerging from under said slip housing when moving toward said deployed position, said slip housing thereby preventing premature movement of said slip toward said deployed position by virtue of said contacting.

12. The method as recited in claim 11 wherein said step of deploying further comprises the steps of:

sliding a slip carrier slidably mounted to said liner and adapted to move axially with respect to said liner; and transmitting a deploying force to said slip via a slip arm extending from said slip carrier and coupling said slip carrier and said slip, said slip arm moving said slip from said retracted position to said deployed position, said slip arm partially collapsing when said deploying force exceeds a predetermined limit, a nose extension of said slip carrier moving toward and directly engaging said slip as said slip arm partially collapses thereby allowing further transmission of said deploying force exceeding said predetermined limit from said slip carrier to said slip via said nose extension thereby centralizing said liner.

13. The method as recited in claim 11, further comprising the step of forcing said slip radially outwardly as said slip moves from said retracted position toward said deployed position with a centralizer mandrel associated with said liner and having a ramp thereon, said slip bearing against said ramp as said gripping surface contacts said casing to hang said liner.

14. The method as recited in claim 11 wherein said liner comprises a duality of axially separated liner hangers cooperating to hang said liner within said casing in a desired location and direction, said method further comprising the step of employing said liner as a drill guide.

15. The method as recited in claim 11 wherein said slip housing is tubular and surrounds said liner, said liner hanger further comprising a plurality of slips located regularly about a circumference of said liner and adapted to slide axially with respect to said liner between retracted positions and deployed positions thereby to centralize said liner as said slips move toward said deployed positions, said method further comprising the step of centralizing said liner.

16. The method as recited in claim 11, further comprising the step of sliding a tubular piston surrounding said liner and coupled to said slip axially with respect to said liner when hydraulic fluid contacting said piston places a force on said piston.

17. The method as recited in claim 11 wherein said step of providing comprises the step of locating said slip within a pocket in an outer wall of said liner, said slip housing covering said pocket and said slip when said slip is in said retracted position.

18. The method as recited in claim 11 wherein said liner extends through a window in said casing, said method further comprising the step of preventing said gripping surface of said slip from contacting a periphery of said window when said slip is in said retracted position with said slip housing, said slip housing thereby preventing said premature movement of said slip toward said deployed position by virtue of said contacting.

19. The method as recited in claim 11 wherein said step of moving comprises the step of moving said liner through a window in said casing, said liner bending and exerting a spring force on a side of said casing, said slip serving to centralize said liner within said casing as said slip moves toward said deployed position.

20. The method as recited in claim 11 wherein said step of deploying comprises the step of shearing a shear pin releasably coupling a slip carrier slidably mounted to said liner and said slip housing.

21. A liner hanger for a liner, comprising:

a slip carrier slidably mounted to said liner and adapted to move axially with respect to said liner; and a slip arm extending from said slip carrier and coupling said slip carrier and a slip having a gripping surface thereon and adapted to slide axially with respect to said liner between a retracted position and a deployed position, said slip carrier capable of transmitting a deploying force to said slip via said slip arm to move said slip from said retracted position to said deployed position, said slip arm partially collapsing when said deploying force exceeds a predetermined limit, a nose extension of said slip carrier moving toward and directly engaging said slip as said slip arm partially collapses thereby allowing further transmission of said deploying force exceeding said predetermined limit from said slip carrier to said slip via said nose extension thereby centralizing said liner.

22. The liner hanger as recited in claim 21, further comprising:

a slip housing located radially outwardly of said slip and covering said slip when said slip is in said retracted position, said slip emerging from under said slip housing when moving toward said deployed position, said slip housing preventing said gripping surface of said slip from contacting a casing when said slip is in said retracted position, said slip housing thereby preventing premature movement of said slip toward said deployed position by virtue of said contacting.

23. The liner hanger as recited in claim 21, further comprising a centralizer mandrel associated with said liner and having a ramp thereon, said ramp forcing said slip radially outwardly as said slip moves from said retracted position toward said deployed position, said slip bearing against said ramp as said gripping surface contacts said casing to hang said liner.

24. The liner hanger as recited in claim 21 wherein said liner comprises a duality of axially separated liner hangers, said duality cooperating to hang said liner within said casing in a desired location and direction, said liner capable of being employed as a drill guide.

25. The liner hanger as recited in claim 21 wherein said slip housing is tubular and surrounds said liner, said liner hanger further comprising a plurality of slips located regularly about a circumference of said liner and adapted to slide axially with respect to said liner between retracted positions and deployed positions thereby to centralize said liner as said slips move toward said deployed positions.

26. The liner hanger as recited in claim 21, further comprising a tubular piston surrounding said liner and coupled to said slip, said piston sliding said slip axially with respect to said liner when hydraulic fluid contacting said piston places a force on said piston.

27. The liner hanger as recited in claim 21 wherein said slip is located within a pocket in an outer wall of said liner, said slip housing covering said pocket and said slip when said slip is in said retracted position.

28. The liner hanger as recited in claim 21 wherein said liner extends through a window in said casing, said slip housing preventing said gripping surface of said slip from contacting a periphery of said window when said slip is in said retracted position, said slip housing thereby preventing said premature movement of said slip toward said deployed position by virtue of said contacting.

29. The liner hanger as recited in claim 21 wherein said liner extends through a window in said casing, said liner bending and exerting a spring force on a side of said casing, said slip serving to centralize said liner within said casing as said slip moves toward said deployed position.

30. The liner hanger as recited in claim 21 wherein a slip carrier slidably mounted to said liner and adapted to move axially with respect to said liner is releasably coupled to said slip housing by a shear pin.

31. A method of hanging a liner within a casing, comprising the steps of:

sliding a slip carrier slidably mounted to said liner and adapted to move axially with respect to said liner; and transmitting a deploying force to a slip on said liner via a slip arm extending from said slip carrier and coupling said slip carrier and said slip, said slip having a gripping surface thereon and adapted to slide axially with respect to said liner between a retracted location and a deployed position, said slip arm moving said slip from said retracted position to said deployed position, said slip arm partially collapsing when said deploying force exceeds a predetermined limit, a nose extension of said slip carrier moving toward and directly engaging said slip as said slip arm partially collapses thereby allowing further transmission of said deploying force exceeding said predetermined limit from said slip carrier to said slip via said nose extension thereby centralizing said liner.

32. The method as recited in claim 31 further comprising the steps of:

providing a slip housing located radially outwardly of said slip and covering said slip when said slip is in said retracted position, said slip housing preventing said gripping surface of said slip from contacting said casing when said slip is in said retracted position;

moving said liner axially through said casing until said liner reaches a predetermined position within said casing; and deploying said slip, said slip emerging from under said slip housing when moving toward said deployed position, said slip housing thereby preventing premature movement of said slip toward said deployed position by virtue of said contacting.

33. The method as recited in claim 31, further comprising the step of forcing said slip radially outwardly as said slip moves from said retracted position toward said deployed position with a centralizer mandrel associated with said liner and having a ramp thereon, said slip bearing against said ramp as said gripping surface contacts said casing to hang said liner.

34. The method as recited in claim 31 wherein said liner comprises a duality of axially separated liner hangers cooperating to hang said liner within said casing in a desired location and direction, said method further comprising the step of employing said liner as a drill guide.

35. The method as recited in claim 31 wherein said slip housing is tubular and surrounds said liner, said liner hanger further comprising a plurality of slips located regularly about a circumference of said liner and adapted to slide axially with respect to said liner between retracted positions and deployed positions thereby to centralize said liner as said slips move toward said deployed positions, said method further comprising the step of centralizing said liner.

36. The method as recited in claim 31, further comprising the step of sliding a tubular piston surrounding said liner and coupled to said slip axially with respect to said liner when hydraulic fluid contacting said piston places a force on said piston.

37. The method as recited in claim 31 wherein said step of providing comprises the step of locating said slip within a pocket in an outer wall of said liner, said slip housing covering said pocket and said slip when said slip is in said retracted position.

38. The method as recited in claim 31 wherein said liner extends through a window in said casing, said method further comprising the step of preventing said gripping surface of said slip from contacting a periphery of said window when said slip is in said retracted position with said slip housing, said slip housing thereby preventing said premature movement of said slip toward said deployed position by virtue of said contacting.

39. The method as recited in claim 31 wherein said step of moving comprises the step of moving said liner through a window in said casing, said liner bending and exerting a spring force on a side of said casing, said slip serving to centralize said liner within said casing as said slip moves toward said deployed position.

40. The method as recited in claim 31 wherein said step of deploying comprises the step of shearing a shear pin releasably coupling a slip carrier slidably mounted to said liner and said slip housing.

41. A drill guide, comprising:

a tubular liner having an upper portion located within a casing and a lower portion extending through a window in said casing, said liner bending and exerting a spring force on a side of said casing, said spring force tending to misalign said liner with respect to a centerline of said casing; and first and second centralizing liner hangers spaced apart along a length of said upper portion, said first and second liner hangers fixing said upper portion of said liner at a desired location within said casing, said first and second liner hangers cooperating to counteract said spring force to centralize said liner with respect to said centerline and hang said liner within said casing in a desired direction, said direction defining a drilling direction of a drilling tool passing through said upper portion;

said first and second liner hangers each comprising:

a slip having a gripping surface thereon and adapted to slide axially with respect to said liner between a retracted position and a deployed position; and a slip housing located radially outwardly of said slip and covering said slip when said slip is in said retracted position, said slip emerging from under said slip housing when moving toward said deployed position, said slip housing preventing said gripping surface of said slip from contacting a casing when said slip is in said retracted position, said slip housing thereby preventing premature movement of said slip toward said deployed position by virtue of said contacting.

42. The drill guide as recited in claim 41, further comprising:

a slip carrier slidably mounted to said liner and adapted to move axially with respect to said liner; and a slip arm extending from said slip carrier and coupling said slip carrier and said slip, said slip carrier capable of transmitting a deploying force to said slip via said slip arm to move said slip from said retracted position to said deployed position, said slip arm partially collapsing when said deploying force exceeds a predetermined limit, a nose extension of said slip carrier moving toward and directly engaging said slip as said slip arm partially collapses thereby allowing further transmission of said deploying force exceeding said predetermined limit from said slip carrier to said slip via said nose extension thereby centralizing said liner.

43. The drill guide as recited in claim 41, further comprising a centralizer mandrel associated with said liner and having a ramp thereon, said ramp forcing said slip radially outwardly as said slip moves from said retracted position toward said deployed position, said slip bearing against said ramp as said gripping surface contacts said casing to hang said liner.

44. The drill guide as recited in claim 41 wherein said slip housing is tubular and surrounds said liner, said liner hanger further comprising a plurality of slips located regularly about a circumference of said liner and adapted to slide axially with respect to said liner between retracted positions and deployed positions thereby to centralize said liner as said slips move toward said deployed positions.

45. The drill guide as recited in claim 41, further comprising a tubular piston surrounding said liner and coupled to said slip, said piston sliding said slip axially with respect to said liner when hydraulic fluid contacting said piston places a force on said piston.

46. The drill guide as recited in claim 41 wherein said slip is located within a pocket in an outer wall of said liner, said slip housing covering said pocket and said slip when said slip is in said retracted position.

47. The drill guide as recited in claim 41 wherein said slip housing preventing said gripping surface of said slip from contacting a periphery of said window when said slip is in said retracted position, said slip housing thereby preventing said premature movement of said slip toward said deployed position by virtue of said contacting.

48. The drill guide as recited in claim 41 wherein a slip carrier slidably mounted to said liner and adapted to move axially with respect to said liner is releasably coupled to said slip housing by a shear pin.

49. The drill guide as recited in claim 41 wherein said drill guide is employed in a multilateral well, said drill guide directing said drilling tool toward a location on said upper portion of said liner.

50. A method of guiding a drill, comprising the steps of:

locating a tubular liner with respect to a casing, said liner having an upper portion located within said casing and a lower portion extending through a window in said casing, said liner bending and exerting a spring force on a side of said casing, said spring force tending to misalign said liner with respect to a centerline of said casing; and fixing said upper portion of said liner at a desired location within said casing with first and second centralizing liner hangers spaced apart along a length of said upper portion, said first and second liner hangers cooperating to counteract said spring force to centralize said liner with respect to said centerline and hang said liner within said casing in a desired direction, said direction defining a drilling direction of a drilling tool passing through said upper portion;

said step of fixing comprising the steps of:

providing a slip on said liner, said slip having a gripping surface thereon and adapted to slide axially with respect to said liner between a retracted location and a deployed position, a slip housing located radially outwardly of said slip and covering said slip when said slip is in said retracted position, said slip housing preventing said gripping surface of said slip from contacting said casing when said slip is in said retracted position;

moving said liner axially through said casing until said liner reaches a predetermined position within said casing; and deploying said slip, said slip emerging from under said slip housing when moving toward said deployed position, said slip housing thereby preventing premature movement of said slip toward said deployed position by virtue of said contacting.

51. The method as recited in claim 50 wherein said step of deploying further comprises the steps of:

sliding a slip carrier slidably mounted to said liner and adapted to move axially with respect to said liner; and transmitting a deploying force to said slip via a slip arm extending from said slip carrier and coupling said slip carrier and said slip, said slip arm moving said slip from said retracted position to said deployed position, said slip arm partially collapsing when said deploying force exceeds a predetermined limit, a nose extension of said slip carrier moving toward and directly engaging said slip as said slip arm partially collapses thereby allowing further transmission of said deploying force exceeding said predetermined limit from said slip carrier to said slip via said nose extension thereby centralizing said liner.

52. The method as recited in claim 50, further comprising the step of forcing said slip radially outwardly as said slip moves from said retracted position toward said deployed position with a centralizer mandrel associated with said liner and having a ramp thereon, said slip bearing against said ramp as said gripping surface contacts said casing to hang said liner.

53. The method as recited in claim 50 wherein said slip housing is tubular and surrounds said liner, said liner hanger further comprising a plurality of slips located regularly about a circumference of said liner and adapted to slide axially with respect to said liner between retracted positions and deployed positions thereby to centralize said liner as said slips move toward said deployed positions, said method further comprising the step of centralizing said liner.

54. The method as recited in claim 50, further comprising the step of sliding a tubular piston surrounding said liner and coupled to said slip axially with respect to said liner when hydraulic fluid contacting said piston places a force on said piston.

55. The method as recited in claim 50 wherein said step of providing comprises the step of locating said slip within a pocket in an outer wall of said liner, said slip housing covering said pocket and said slip when said slip is in said retracted position.

56. The method as recited in claim 50 wherein said liner extends through a window in said casing, said method further comprising the step of preventing said gripping surface of said slip from contacting a periphery of said window when said slip is in said retracted position with said slip housing, said slip housing thereby preventing said premature movement of said slip toward said deployed position by virtue of said contacting.

57. The method as recited in claim 50 wherein said step of deploying comprises the step of shearing a shear pin releasably coupling a slip carrier slidably mounted to said liner and said slip housing.

58. The method as recited in claim 50 wherein said drill guide is employed in a multilateral well, said method further comprising the step of directing said drilling tool toward a location on said upper portion of said liner with said drill guide.

* * * * *